(12) United States Patent
Blaney et al.

(10) Patent No.: US 11,326,463 B2
(45) Date of Patent: May 10, 2022

(54) BOAS THERMAL BAFFLE

(71) Applicant: RaytheonTechnologies Corporation, Farmington, CT (US)

(72) Inventors: Ken F. Blaney, Middleton, NH (US); Thomas E. Clark, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/893,595

(22) Filed: Jun. 5, 2020

(65) Prior Publication Data

US 2020/0400032 A1 Dec. 24, 2020

Related U.S. Application Data

(60) Provisional application No. 62/863,508, filed on Jun. 19, 2019.

(51) Int. Cl.
*F01D 11/00* (2006.01)
*F01D 25/24* (2006.01)

(52) U.S. Cl.
CPC .......... *F01D 11/001* (2013.01); *F01D 11/005* (2013.01); *F01D 25/246* (2013.01); *F05D 2300/6033* (2013.01)

(58) Field of Classification Search
CPC .............................. F01D 11/001; F01D 25/246
See application file for complete search history.

(56) References Cited

U.S. PATENT DOCUMENTS

| | | | | |
|---|---|---|---|---|
| 3,966,356 A | * | 6/1976 | Irwin | F01D 11/08 415/173.3 |
| 4,650,394 A | * | 3/1987 | Weidner | F01D 11/08 415/115 |
| 5,988,975 A | * | 11/1999 | Pizzi | F01D 11/005 415/139 |
| 7,600,967 B2 | * | 10/2009 | Pezzetti, Jr. | F01D 11/005 415/115 |
| 9,726,043 B2 | | 8/2017 | Franks et al. | |
| 9,810,086 B2 | * | 11/2017 | Correia | F01D 11/005 |
| 9,932,901 B2 | | 4/2018 | Sener | |
| 10,087,784 B2 | | 10/2018 | Shapiro et al. | |
| 10,753,220 B2 | * | 8/2020 | Clark | F01D 11/08 |
| 11,022,002 B2 | * | 6/2021 | Clark | F01D 11/08 |
| 2011/0318171 A1 | * | 12/2011 | Albers | F01D 25/246 415/173.1 |

(Continued)

*Primary Examiner* — J. Todd Newton
*Assistant Examiner* — Theodore C Ribadeneyra
(74) *Attorney, Agent, or Firm* — Carlson, Gaskey & Olds, P.C.

(57) ABSTRACT

A blade outer air seal assembly includes a support structure. A blade outer air seal has a plurality of segments that extend circumferentially about an axis and mounted in the support structure. At least two of the segments have a first wall circumferentially spaced from a second wall. A base portion extends from the first wall to the second wall. A recess is arranged in at least one of the first wall and the second wall. An intersegment seal is arranged between the at least two segments. The intersegment seal has a circumferentially extending portion and a radially extending tab. The radially extending tab extends into the recess to define at least two cavities within the recess.

18 Claims, 4 Drawing Sheets

(56) References Cited

U.S. PATENT DOCUMENTS

| | | | | |
|---|---|---|---|---|
| 2012/0107122 A1* | 5/2012 | Albers | .................. | F01D 25/246 |
| | | | | 416/179 |
| 2012/0171027 A1* | 7/2012 | Albers | .................. | F01D 11/005 |
| | | | | 415/208.1 |
| 2014/0271142 A1* | 9/2014 | Albers | .................. | F01D 11/122 |
| | | | | 415/173.1 |
| 2015/0377035 A1* | 12/2015 | Freeman | ............... | F01D 25/246 |
| | | | | 416/191 |
| 2016/0312639 A1* | 10/2016 | Shapiro | .................. | F01D 25/28 |
| 2016/0333703 A1* | 11/2016 | Sener | ...................... | F01D 5/225 |
| 2016/0333740 A1* | 11/2016 | Sluyter | ...................... | F01D 9/04 |
| 2016/0348521 A1* | 12/2016 | Sippel | ..................... | F01D 5/225 |
| 2018/0037511 A1* | 2/2018 | Watanabe | ............... | F01D 11/00 |
| 2018/0195401 A1* | 7/2018 | Sippel | ................... | F01D 11/005 |
| 2018/0238193 A1* | 8/2018 | Baucco | .................. | F01D 11/005 |
| 2018/0283213 A1* | 10/2018 | Shirota | ................... | F16B 19/02 |
| 2019/0040758 A1* | 2/2019 | Quennehen | ............. | F01D 11/08 |
| 2019/0153886 A1* | 5/2019 | Vetters | .................. | F01D 25/246 |

\* cited by examiner

US 11,326,463 B2

BOAS THERMAL BAFFLE

CROSS-REFERENCE TO RELATED APPLICATIONS

This application claims priority to U.S. Provisional Application No. 62/863,508, which was filed on Jun. 19, 2019 and is incorporated herein by reference.

BACKGROUND

This application relates an intersegment seal for a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY OF THE INVENTION

In one exemplary embodiment, a blade outer air seal assembly includes a support structure. A blade outer air seal has a plurality of segments that extend circumferentially about an axis and mounted in the support structure. At least two of the segments have a first wall circumferentially spaced from a second wall. A base portion extends from the first wall to the second wall. A recess is arranged in at least one of the first wall and the second wall. An intersegment seal is arranged between the at least two segments. The intersegment seal has a circumferentially extending portion and a radially extending tab. The radially extending tab extends into the recess to define at least two cavities within the recess.

In a further embodiment of the above, the intersegment seal has a plurality of radially extending tabs that extend into the recess.

In a further embodiment of any of the above, the circumferentially extending portion and the radially extending tab form a T shaped cross-section.

In a further embodiment of any of the above, the intersegment seal has a thickness of greater than about 0.02 inches (0.508 mm).

In a further embodiment of any of the above, the circumferentially extending portion abuts a radially outermost portion of the first and second walls.

In a further embodiment of any of the above, the circumferentially extending portion extends in an axial direction for at least 85% of an axial length of the first wall.

In a further embodiment of any of the above, the recess forms a gap between the at least two segments. The gap has a width of at between about 0.007 and 0.10 inches (0.178-2.54 mm).

In a further embodiment of any of the above, a clip secures the intersegment seal to the at least two segments.

In a further embodiment of any of the above, the clip is a metallic material.

In a further embodiment of any of the above, the intersegment seal is a ceramic material.

In a further embodiment of any of the above, the intersegment seal is a metallic material.

In a further embodiment of any of the above, the blade outer air seal is a ceramic matrix composite material.

In another exemplary embodiment, a gas turbine engine includes a compressor section, a combustor section, and a turbine section arranged about an axis of rotation. A blade outer air seal assembly has a plurality of segments that extend circumferentially about the axis of rotation axis and mounted in a support structure. At least two of the segments have a first wall circumferentially spaced from a second wall. A base portion extends from the first wall to the second wall. A recess is arranged in at least one of the first wall and the second wall. An intersegment seal is arranged between the at least two segments. The intersegment seal has a circumferentially extending portion and a radially extending tab. The radially extending tab extends into the recess to define at least two cavities within the recess.

In a further embodiment of any of the above, the turbine section has a plurality of blades arranged radially inward of the blade outer air seal assembly. The plurality of blades is configured to push air into the cavities as each blade passes the cavities.

In a further embodiment of any of the above, the intersegment seal has a plurality of radially extending tabs that extend into the recess.

In a further embodiment of any of the above, the circumferentially extending portion and the radially extending tab form a T shaped cross-section.

In a further embodiment of any of the above, the recess forms a gap between the at least two segments. The gap has a width of at between about 0.007 and 0.10 inches (0.178-2.54 mm).

In a further embodiment of any of the above, the at least two segments are a ceramic material.

In a further embodiment of any of the above, the intersegment seal is ceramic material.

In a further embodiment of any of the above, the intersegment seal is a metallic material.

DETAILED DESCRIPTION

Figure 1:
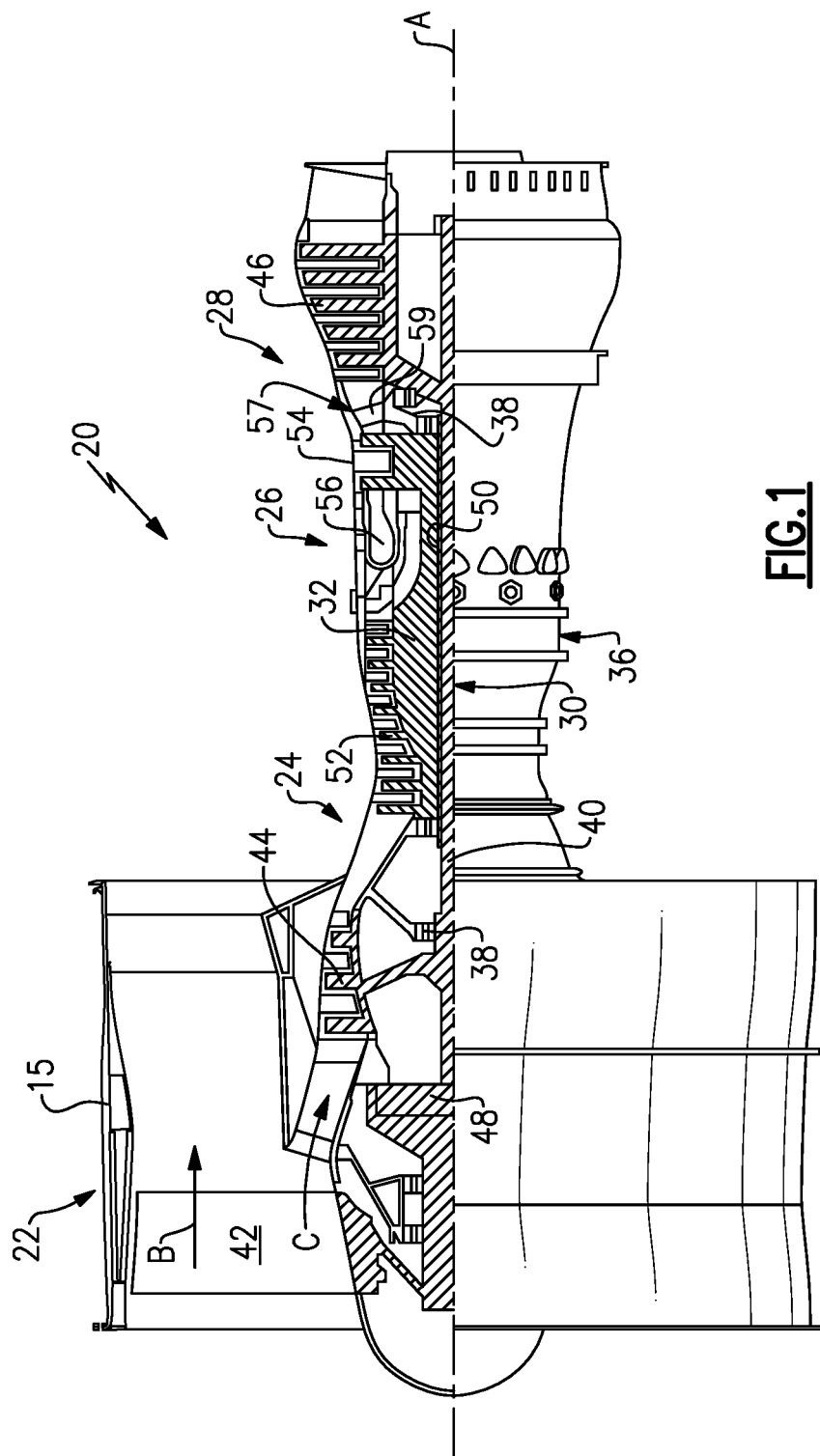
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

Figure 2:
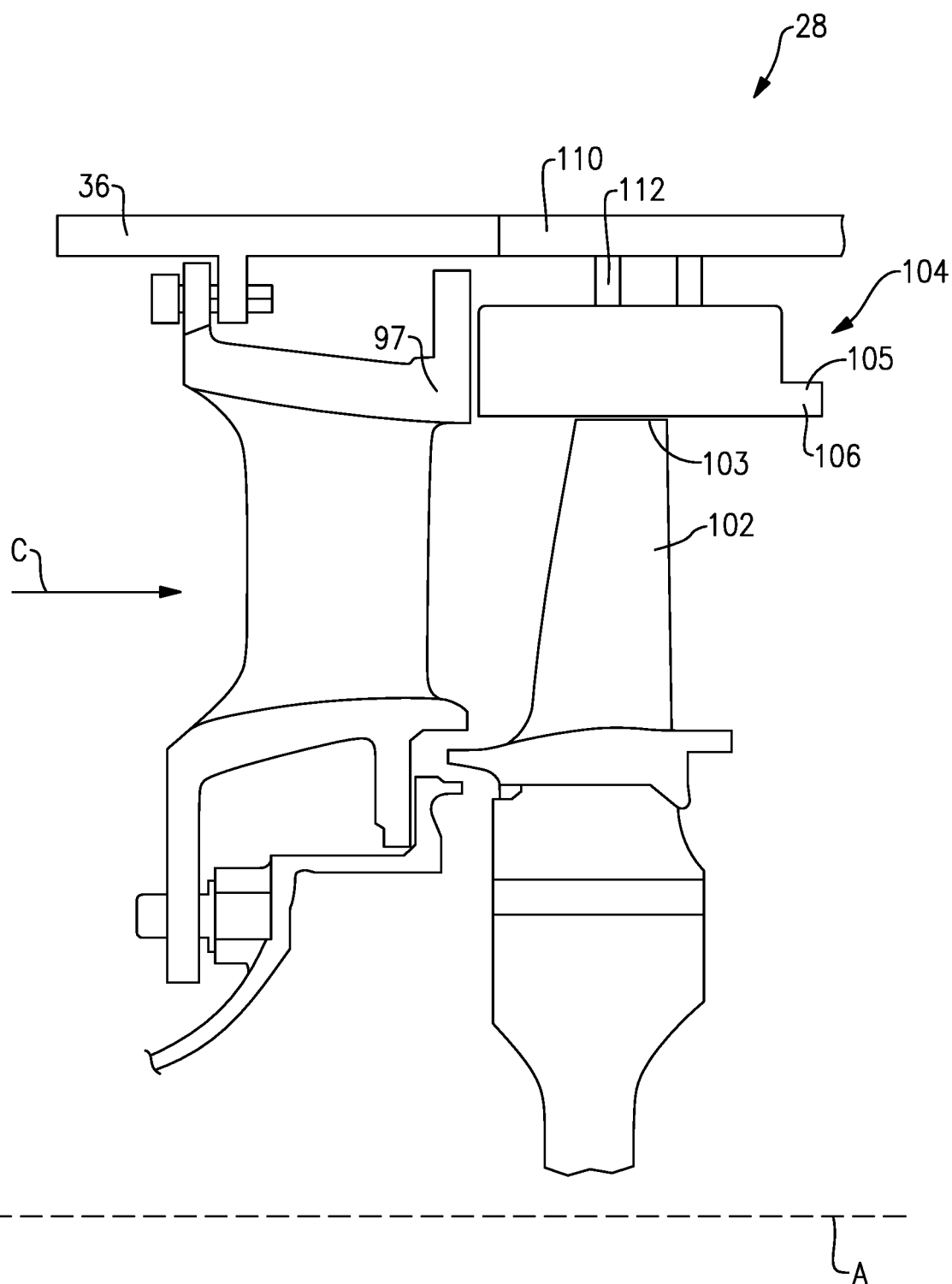
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a ceramic material, such as a ceramic matrix composite ("CMC") or monolithic ceramic.

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
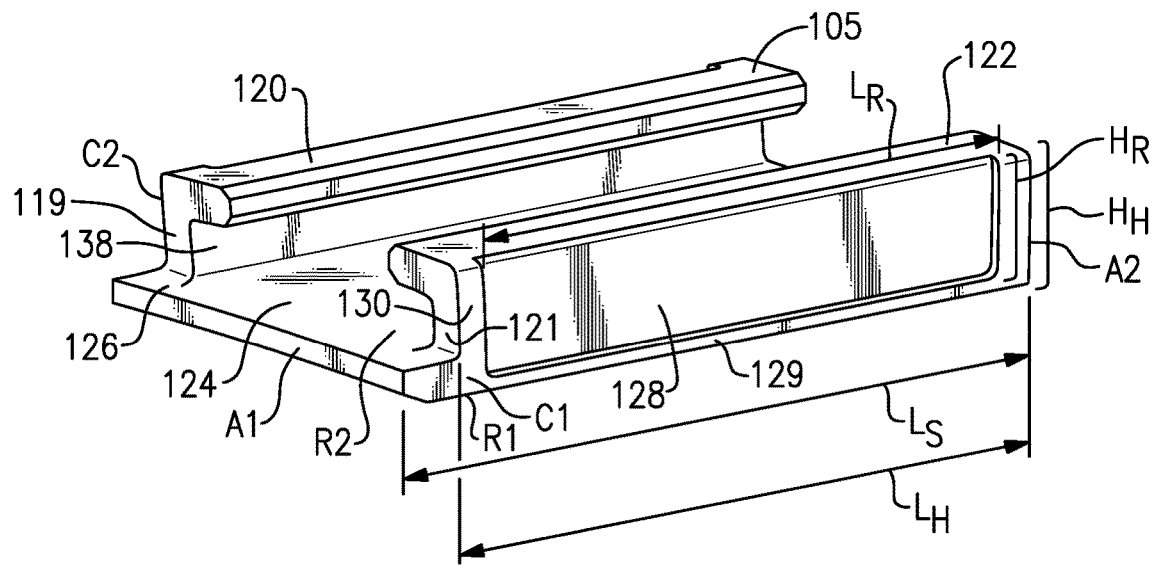
FIG. 3 illustrates an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 119 having a first hook 120 and a second wall 121 having a second hook 122. The first and second walls 119, 121 extend radially outward from a base portion 124, and the first and second hooks 120, 122 extend circumferentially from the first and second walls 119, 121, respectively. The first and second hooks 120, 122 extend along the base portion 124 in a generally axial direction, and are circumferentially spaced from one another. The base portion 124 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 124 may extend axially forward and/or aft of the first and second hooks 120, 122 to provide a surface 126 for sealing of the BOAS first and second axial sides A1, A2. The hooks 120, 122 provide a passage 138 for securing the BOAS segment 105 to the carrier 112 and/or support structure 110. In this example, the hooks 120, 122 extend towards the matefaces, or first and second circumferential sides C1, C2.

A recess 128 is defined in the first and second circumferential sides C1, C2. The recess 128 is bounded by a portion 129 of the wall 121 at a radially inner side and at a portion 130 of the wall 121 at the axial sides.

In one example, the seal segment 105 has a length $L_S$ in the axial direction. The hooks 120, 122 have a length $L_H$ that is the same or smaller than the length $L_S$. The recess 128 has a length $L_R$ that is smaller than the hook length $L_H$. The recess 128 also has a height $H_R$ in the circumferential direction that is smaller than a height $H_H$ of the walls 119, 121.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further densified by adding additional material to coat the laminates.

Figure 4:
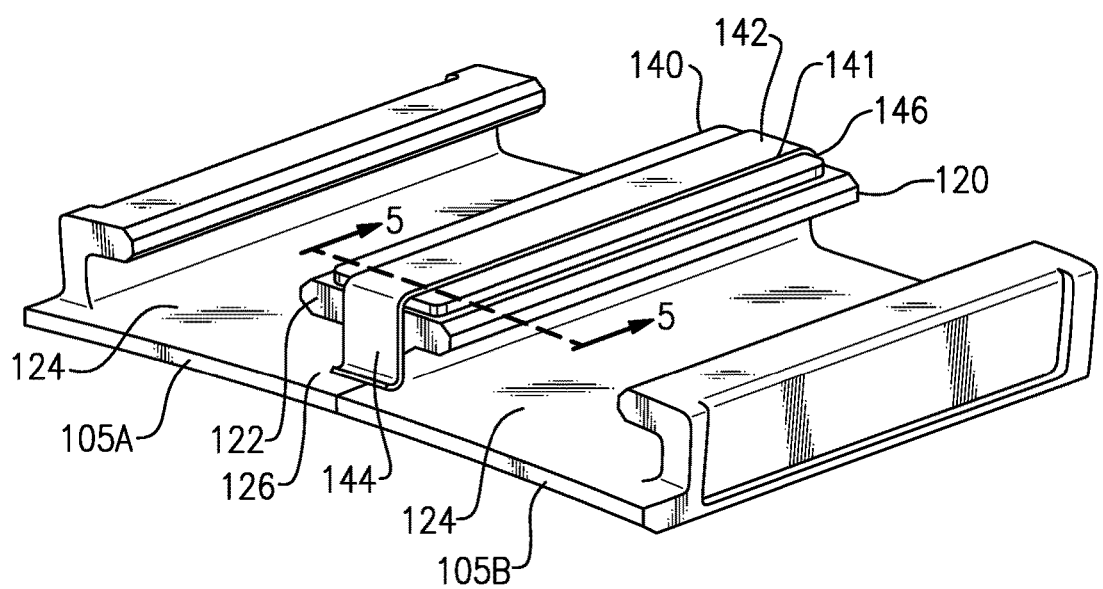
FIG. 4 illustrates a portion of an exemplary blade outer air seal assembly.

FIG. 4 illustrates a portion of the example BOAS assembly 104. An intersegment seal 140 is arranged between two adjacent BOAS segments 105A, 105B. A clip 142 secures the intersegment seal 140 in place. The clip 142 has a radially outer portion 141 and radially inward extending legs 144, 146. The legs 144, 146 may be spring loaded to secure the clip 142 in place, for example. The clip 142 fits over the hooks 120, 122 of the adjacent seal segments 105A, 105B. The radially outer portion 141 extends along the length of the hooks 120, 122. Although an example clip 142 arrangement is shown, other clip arrangements may be used to secure the intersegment seal 140 in the circumferential and/or axial directions. The clip 142 may be formed from a metallic material, such as cobalt or nickel, for example.

The intersegment seal 140 extends in the axial direction for most of the axial length of the hooks 120, 122. For example, the intersegment seal 140 may extend at least 85% of an axial length of the hooks 120, 122.

Figure 5:
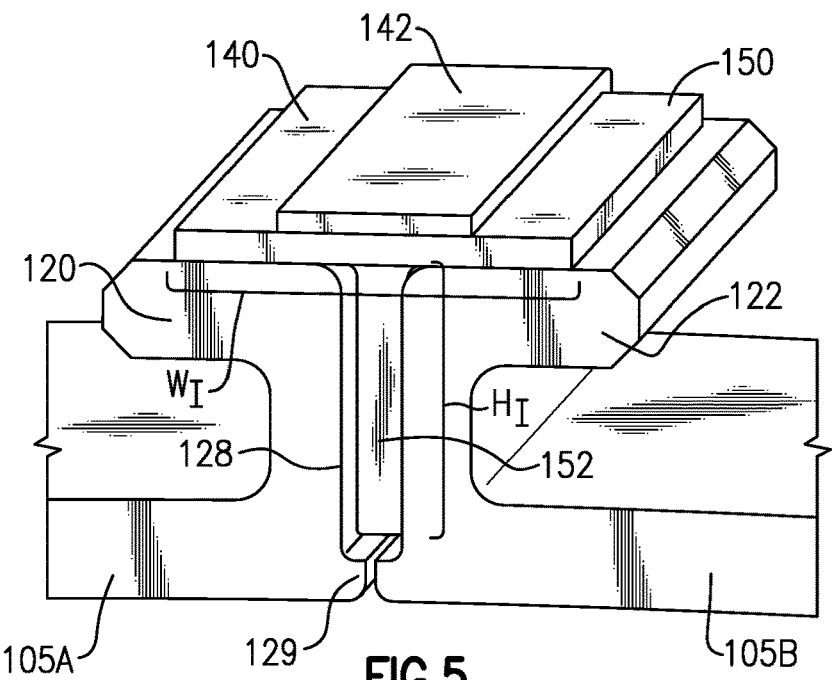
FIG. 5 illustrates an example cross sectional view of a portion of the blade outer air seal assembly of FIG. 4.

FIG. 5 illustrates a cross-sectional view of the portion of the BOAS assembly 104 taken along line 5-5 of FIG. 4. As can be seen, the intersegment seal 140 generally includes a radially outer portion 150 and a radially inwardly extending tab 152. The portion 150 and tab 152 generally form a "T" shaped cross section. The tab 152 fits within the recesses 128 formed in the seal segments 105A, 105B.

The radially outer portion 150 has a width $W_I$ in the circumferential direction. The tab 152 has a height $H_I$ in the radial direction. The tab height $H_I$ is smaller than the hook height $H_H$ (shown in FIG. 3). The width $W_I$ provides a surface for mating with the hooks 120, 122, and helps prevent the intersegment seal 140 from falling radially inward into the gaspath.

The recesses 128 of adjacent seal segments 105A, 105B form a gap between matefaces. The tab 152 fits within the gap. This gap between matefaces may change in size over operation of the engine 20. The gap between matefaces may be between about 0.007 and 0.10 inches (0.178-2.54 mm), for example.

Figure 6:
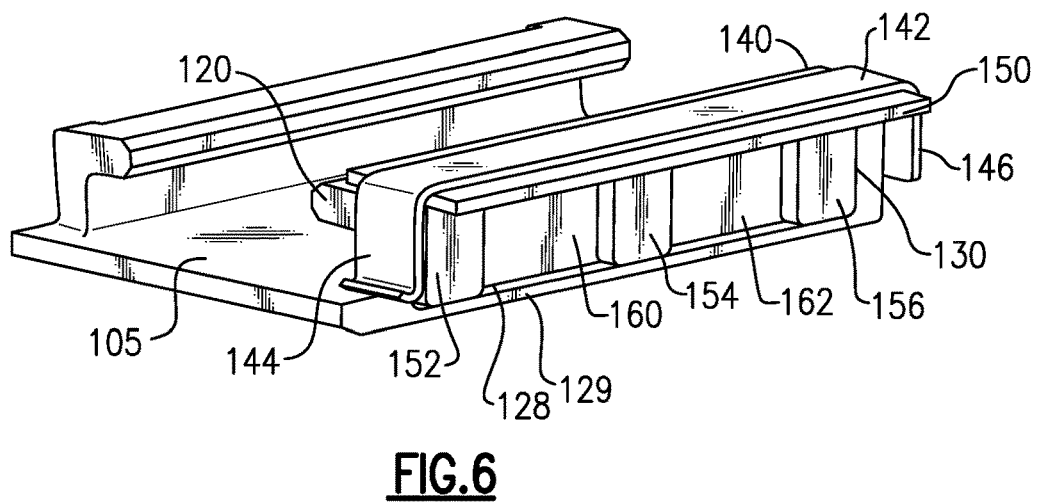
FIG. 6 illustrates a portion of the exemplary blade outer air seal assembly.

FIG. 6 illustrates a portion of the example BOAS assembly 104. The intersegment seal 140 may have a plurality of tabs 152 that extend radially inward. In the illustrated example, the intersegment seal 140 has three tabs 152, 154, 156. The tabs 152, 154, 156 form cavities 160, 162. In this example, tabs 152 and 154 form the first cavity 160, and tabs 154 and 156 form the second cavity 162. The axially forward and aft tabs 152, 156 may abut the portions 130 of the hook 122 at the axial sides of the segment 105. The radially innermost portion of the tabs 152, 154, 156 may abut the portion 129 at a radially inner side.

Figure 7:
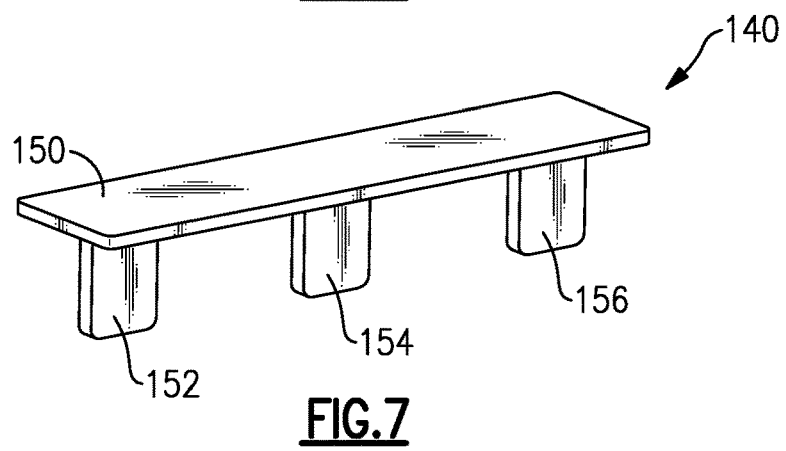
FIG. 7 illustrates an example intersegment seal for a blade outer air seal assembly.

FIG. 7 illustrates an example intersegment seal 140. In this example, the three tabs 152, 154, 156 form two cavities 160, 162. In other examples, more or fewer tabs may be used. For example, the intersegment seal 140 could form fewer than 10 cavities. In another example, the intersegment seal 140 may form between 2 and 4 cavities. The number of tabs and axial length of the tabs may depend on the size and shape of the blades in the turbine, for example.

The intersegment seal 140 is formed from a material having a high thermal resistance. For example, the intersegment seal 140 may be a ceramic material, such as a ceramic matrix composite. In other examples, the intersegment seal 140 may be a metallic material, such as single crystal nickel. The tabs 152, 154, 156 may have a thickness in the circumferential direction of greater than about 0.02 inches (0.508 mm), for example.

As turbine blades 102 (shown in FIG. 2) rotate, pressure ahead and behind the blade 102 as it passes the BOAS gap creates a pumping action. The cavities 160, 162 form a place for this air to go. That is, the intersegment seal 140 utilizes gaspath air within the matefaces of adjacent seal segments 105A, 105B. As this hot air heads radially outward between adjacent seal segments 105A, 105B, the hooks 120, 122 are heated.

Known BOAS arrangements have thermally driven stress between the hot gaspath and the colder hook attachment regions. The disclosed BOAS arrangement utilizes intentional gaspath ingestion for mateface heating to reduce thermal stress on the BOAS segments. The disclosed arrangement adds hot air to minimize the thermal gradient within the part. Although this may increase the bulk CMC temperature, it improves the thermal gradient within the component. The intersegment seal arrangement takes advantage of the rotating blades and static pressure wave interactions within the turbine. The intersegment seal arrangement allows gas path air to be pumped in and out of the BOAS intersegment gaps transiently as the blade passes the mateface gaps. This pumping action helps to reduce the thermal stress within the BOAS segment by heating the BOAS hook attachment regions. The axially running hooks are heated by the gas path air pumped into the cavities by the turbine blades.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
a support structure;
a blade outer air seal having a plurality of segments extending circumferentially about an axis and mounted in the support structure, at least two of the segments having a first wall circumferentially spaced from a second wall, the first and second walls extending radially outward from a base portion, the base portion extending from the first wall to the second wall, and a recess arranged in at least one of the first wall and the second wall; and
an intersegment seal arranged between the at least two segments, the intersegment seal having a circumferentially extending portion and a radially extending tab, the radially extending tab extending into the recess to define at least two cavities within the recess, wherein the circumferentially extending portion abuts a radially outermost portion of the first and second walls.

2. The blade outer air seal assembly of claim 1, wherein the intersegment seal has a plurality of radially extending tabs that extend into the recess.

3. The blade outer air seal assembly of claim 1, wherein the circumferentially extending portion and the radially extending tab form a T shaped cross-section.

4. The blade outer air seal assembly of claim 1, wherein the intersegment seal has a thickness of greater than 0.02 inches (0.508 mm).

5. The blade outer air seal assembly of claim 1, wherein the circumferentially extending portion extends in an axial direction for at least 85% of an axial length of the first wall.

6. The blade outer air seal assembly of claim 1, wherein the recess forms a gap between the at least two segments, the gap having a width between about 0.007 and 0.10 inches (0.178-2.54 mm).

7. The blade outer air seal assembly of claim 1, wherein a clip secures the intersegment seal to the at least two segments.

8. The blade outer air seal assembly of claim 7, wherein the clip is a metallic material.

9. The blade outer air seal assembly of claim 1, wherein the intersegment seal is a ceramic material.

10. The blade outer air seal assembly of claim 1, wherein the intersegment seal is a metallic material.

11. The blade outer air seal assembly of claim 1, wherein the blade outer air seal is a ceramic matrix composite material.

12. A gas turbine engine, comprising:
a compressor section, a combustor section, and a turbine section arranged about an axis of rotation;
a blade outer air seal assembly having a plurality of segments extending circumferentially about the axis of rotation axis and mounted in a support structure, at least two of the segments having a first wall circumferentially spaced from a second wall, the first and second walls extending radially outward from a base portion, the base portion extending from the first wall to the second wall, and a recess arranged in at least one of the first wall and the second wall; and
an intersegment seal arranged between the at least two segments, the intersegment seal having a circumferentially extending portion and a radially extending tab, the radially extending tab extending into the recess to define at least two cavities within the recess; and
wherein the turbine section has a plurality of blades arranged radially inward of the blade outer air seal assembly, the plurality of blades is configured to push air into the cavities as each blade passes the cavities.

13. The gas turbine engine of claim 12, wherein the intersegment seal has a plurality of radially extending tabs that extend into the recess.

14. The gas turbine engine of claim 12, wherein the circumferentially extending portion and the radially extending tab form a T shaped cross-section.

15. The gas turbine engine of claim 12, wherein the recess forms a gap between the at least two segments, the gap having a width between about 0.007 and 0.10 inches (0.178-2.54 mm).

16. The gas turbine engine of claim 12, wherein the at least two segments are a ceramic material.

17. The gas turbine engine of claim 12, wherein the intersegment seal is a ceramic material.

18. The gas turbine engine of claim 12, wherein the intersegment seal is a metallic material.

* * * * *